United States Patent [19]
Gordon, Sr.

[11] Patent Number: 5,216,974
[45] Date of Patent: Jun. 8, 1993

[54] VESSEL FOR COLLECTING AND SEPARATING OIL/WATER IN A MARINE ENVIRONMENT USING SUBMERGED INTERNAL COLLECTION AND SEPARATION

[75] Inventor: Ellison T. Gordon, Sr., Covington, La.

[73] Assignee: Eshia Boo, Inc., Larose, La.

[21] Appl. No.: 723,927

[22] Filed: Jul. 1, 1991

Related U.S. Application Data

[63] Continuation-in-part of Ser. No. 441,974, Nov. 28, 1989, Pat. No. 5,027,738.

[51] Int. Cl.$^5$ ............................................. B63B 35/00
[52] U.S. Cl. ................................... 114/270; 210/242.3
[58] Field of Search ................. 114/270; 210/242.3, 210/242.4, 257.1, 258, 259, 923, 924

[56] References Cited

U.S. PATENT DOCUMENTS

| | | | |
|---|---|---|---|
| 3,890,234 | 6/1975 | Galicia | 210/242.3 |
| 4,637,497 | 6/1987 | Lundkin | 210/242.3 |
| 4,818,399 | 4/1989 | Midkiff | 210/242.3 |
| 5,027,738 | 7/1991 | Gordon, Sr. | 114/270 |

Primary Examiner—Jesus D. Sotelo
Attorney, Agent, or Firm—Pravel, Hewitt, Kimball & Krieger

[57] ABSTRACT

An oil spill retrieval vessel has an influent for collecting oil and seawater that forms an oil spill or slick. The vessel has an interior that contains the skimmed oil and water and separates the oil within the vessel and underwater. A plurality of separator surfaces inside the vessel and below water surface are vertically stacked to catch and accumulate oil as it rises within the vessel interior. An influent flow line has oil outlets along a portion under the separator for preliminarily accumulating oil droplets on louvers that angle away from each outlet on the influent flow line. A transverse baffle plate above the separators has openings with angled plate-like members or louvers thereon for further accumulating and concentrating the oil that leaves the separator. In this fashion, a three-stage oil accumulation and oil-water separation system is provided that includes: 1) the influent flow line; 2) the separator with its vertically spaced plates; and 3) the transverse baffle plate and its louvered openings.

11 Claims, 9 Drawing Sheets

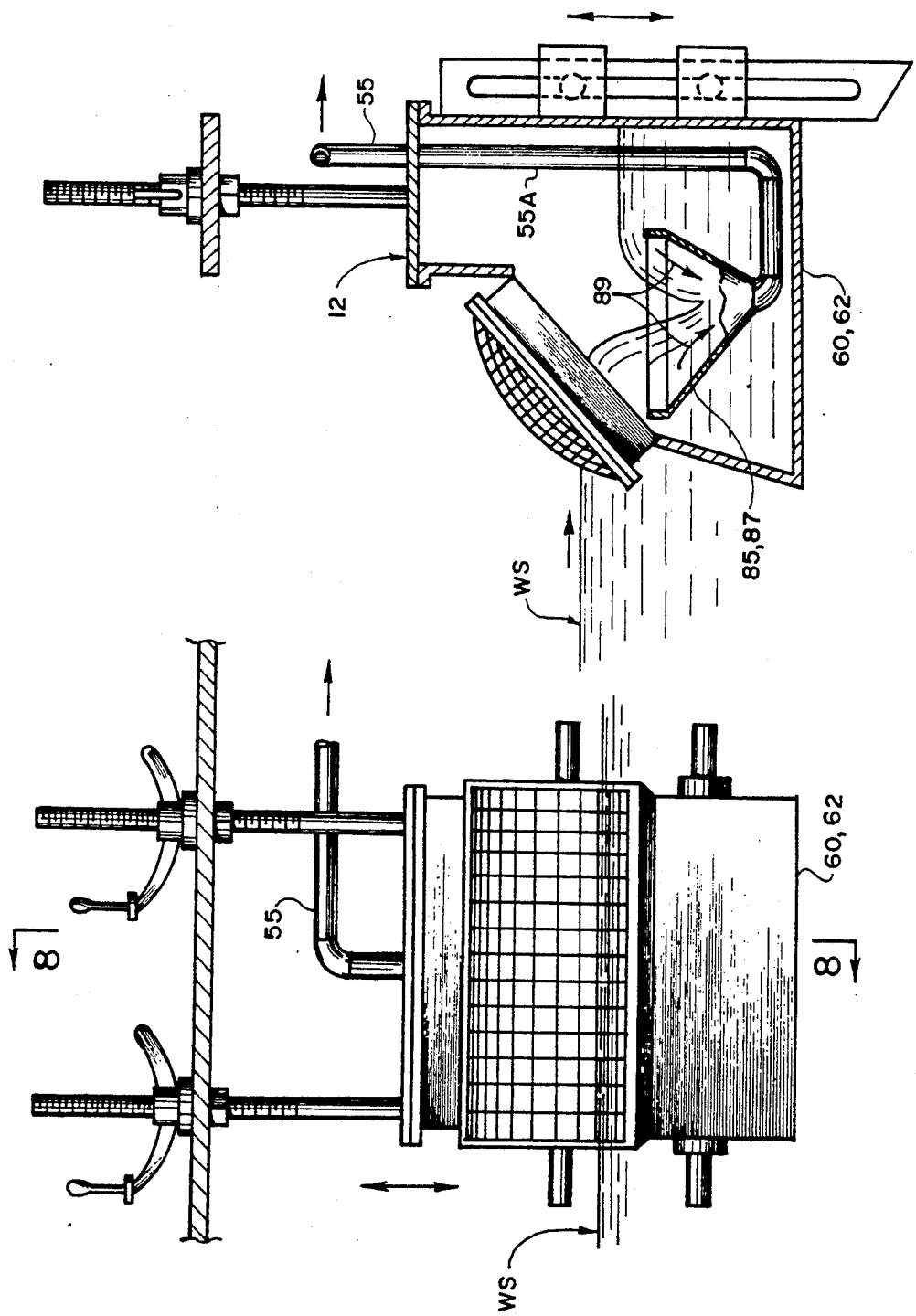

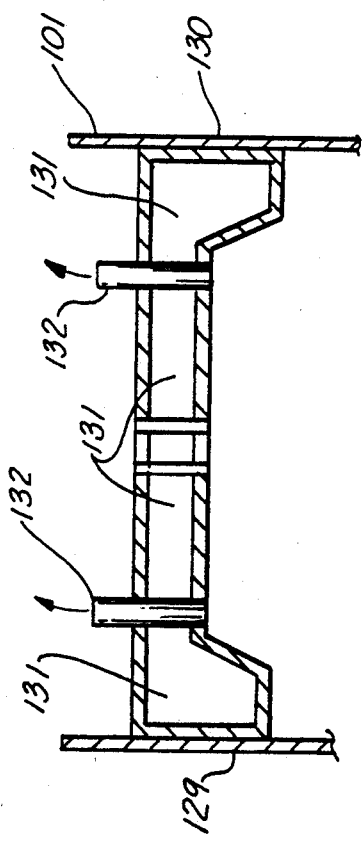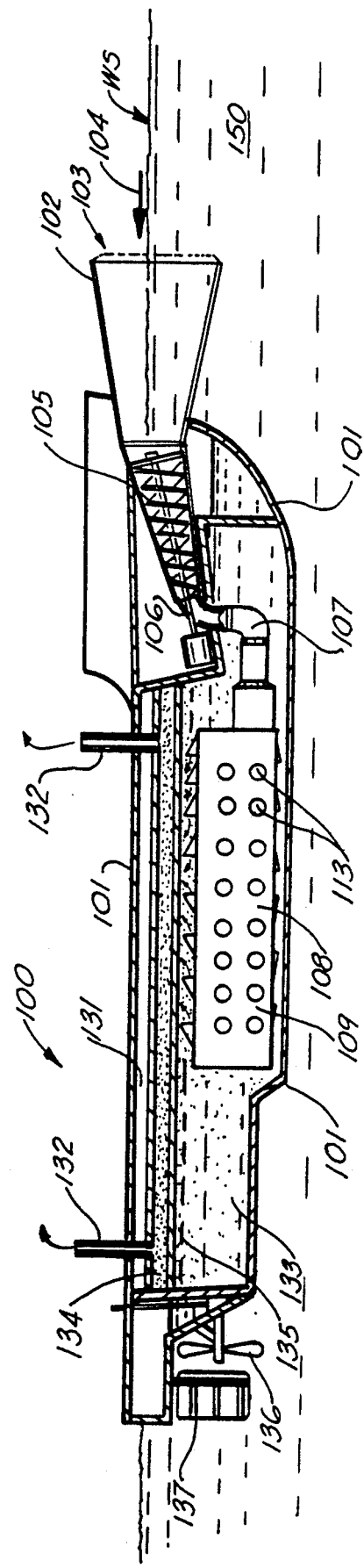

VESSEL FOR COLLECTING AND SEPARATING OIL/WATER IN A MARINE ENVIRONMENT USING SUBMERGED INTERNAL COLLECTION AND SEPARATION

CROSS REFERENCE TO RELATED APPLICATIONS

This is a continuation-in-part of copending U.S. patent application Ser. No. 07/441,974, filed Nov. 28, 1989, now U.S. Pat. No. 5,027,738, issued Jul. 2, 1991, which is incorporated herein by reference.

BACKGROUND OF THE INVENTION

1. Field of the Invention

The present invention relates to marine vessels for use in retrieving oil that has been spilled into an aquatic marine environment, and more particularly relates to an improved oil recovery system for use in a marine environment wherein a deep draft vessel provides an oil holding interior that includes one or more oil separators positioned under the water surface of the vessel interiors so that oil separation takes place underwater, enhancing oil/water separation and providing for continuous and/or intermittent discharge of water and continuous and/or intermittent batch-type removal of the separated oil. Further, an improved influent flow conduit system enhances accumulation of oil at multiple stages as an oil/water mixture is gathered from the surrounding marine environment.

2. General Background

In the clean-up of oil spills, it has been known to use vessels having an intake that skims a combination of oil and water into the vessel interior. Thereafter, the oil is separated by pumping it into separators or by simply filling the vessel completely to its capacity with whatever oil can be skimmed. The problem with such vessels is that they are limited by the capacity of their interior oil containing compartment which can be only a very small fraction of the overall volume of oil contained in the spill.

Another problem with oil skimmer vessels is that they must typically be large enough to contain a sufficient volume of oil so that their construction is very expensive as compared to their ability to contain a certain volume of oil.

Other types of skimmers include an elongated endless belt in the form of a brush-type structure which is dispensed to the oil slick and which returns to a mother ship where a squeezing mechanism separates the oil which accumulates in the endless belt.

Other types of oil skimmers include long flexible booms that accumulate the oil in to a central area within the boom so that pumps can simply suction the accumulated oil into a container such as a barge. The problem with booms is that so often the oil spreads quickly and cannot be boomed off before it has spread over an area much larger than the boom itself can encompass.

Another problem with prior art-type oil skimmer devices is that they are usually large, clumsy, and have an inability to quickly be placed in service at the time the spill occurs.

Thus, there is a need for a relatively small, yet efficient oil retrieving vessel which not only accumulates oil but also continuously separates the oil from the collected water so that it can be quickly and continuously dispensed to a remote collection facility such as a barge.

It is thus an object of the present invention to provide an improved oil/water separation system that functions in a marine environment to continuously ingest large volumes of floating oil and the adjacent seawater for internal separation.

It is further object of the present invention to provide an improved marine vessel oil skimmer that can handle large volumes of an oil/seawater mixture with relatively small vessel size.

It is another object of the present invention to provide an improved oil/water skimmer in the form of a marine vessel that separates oil and water at multiple locations along an influent conduit path.

SUMMARY OF THE PRESENT INVENTION

The present invention solves these prior art problems and shortcomings by providing a highly efficient yet relatively low cost marine vessel for accumulating and separating oil in a marine environment after a spill.

The present invention provides a vessel having an interior collection chamber for receiving an influent oil and water mixture from the adjacent sea surface after a spill has occurred. At least a portion of the collection chamber extends to an elevation below the sea level surface during use. One or more oil/water separators, contained within the vessel collection chamber are positioned at least partially below the sea level surface during use so that oil and water can be separated by the separator below the sea level surface using the mechanical action of the separator on oil attempting to rise to the sea level surface.

The separator includes a plurality of vertically spaced members with surfaces that allow rising oil to accumulate thereon during separation, and an oil inlet at the lower end portion of the separator for adding oil to the separator.

One or more intakes are provided for collecting oil and water from the adjacent sea surface (such as after an oil spill) and a flow line is provided for communicating oil from the intake to the separator at the oil inlet portion thereof.

In the preferred embodiment, the intake is in the form of catch basins having outlets with an elevation below the sea level surface during use. In the preferred embodiment, the intakes include booms extending outwardly from the vessel for channeling oil to the intake as the vessel is moved.

In the preferred embodiment, the separator includes a closed wall separator structure having multiple vertically spaced plates therein.

At least some of the plates are angled with respect to horizontal, and some of the plates are parallel to each other.

In the preferred embodiment, the separator is a closed wall structure having a bottom and side walls, defining an oil holding interior and the side walls include one or more water outlets, the oil inlet communicates with the bottom and the interior has multiple, transverse and vertically spaced-apart plate members with surfaces for catching and accumulating oil that is rising within the interior. The oil that is transmitted to the separators via the oil inlet flows upwardly in the separator and is interrupted in its upward vertical movement by the plurality of plates. Oil accumulates on the plurality of plates while water flows laterally out of the separator.

In the preferred embodiment, there is provided a flow line for indicating when the vessel interior is filled with oil so that discharge of the oil can be initiated to a remote storage location, such as a barge, for example.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein:

FIG. 7 is another fragmentary elevational view of the oil intake portion of the preferred embodiment of the apparatus of the present invention;

FIG. 8 is a sectional view taken along lines 8—8 of FIG. 7;

FIGS. 11 and 12 are fragmentary views of an alternate embodiment of the apparatus of the present invention.

DETAILED DESCRIPTION OF THE PREFERRED EMBODIMENT

Figure 1:
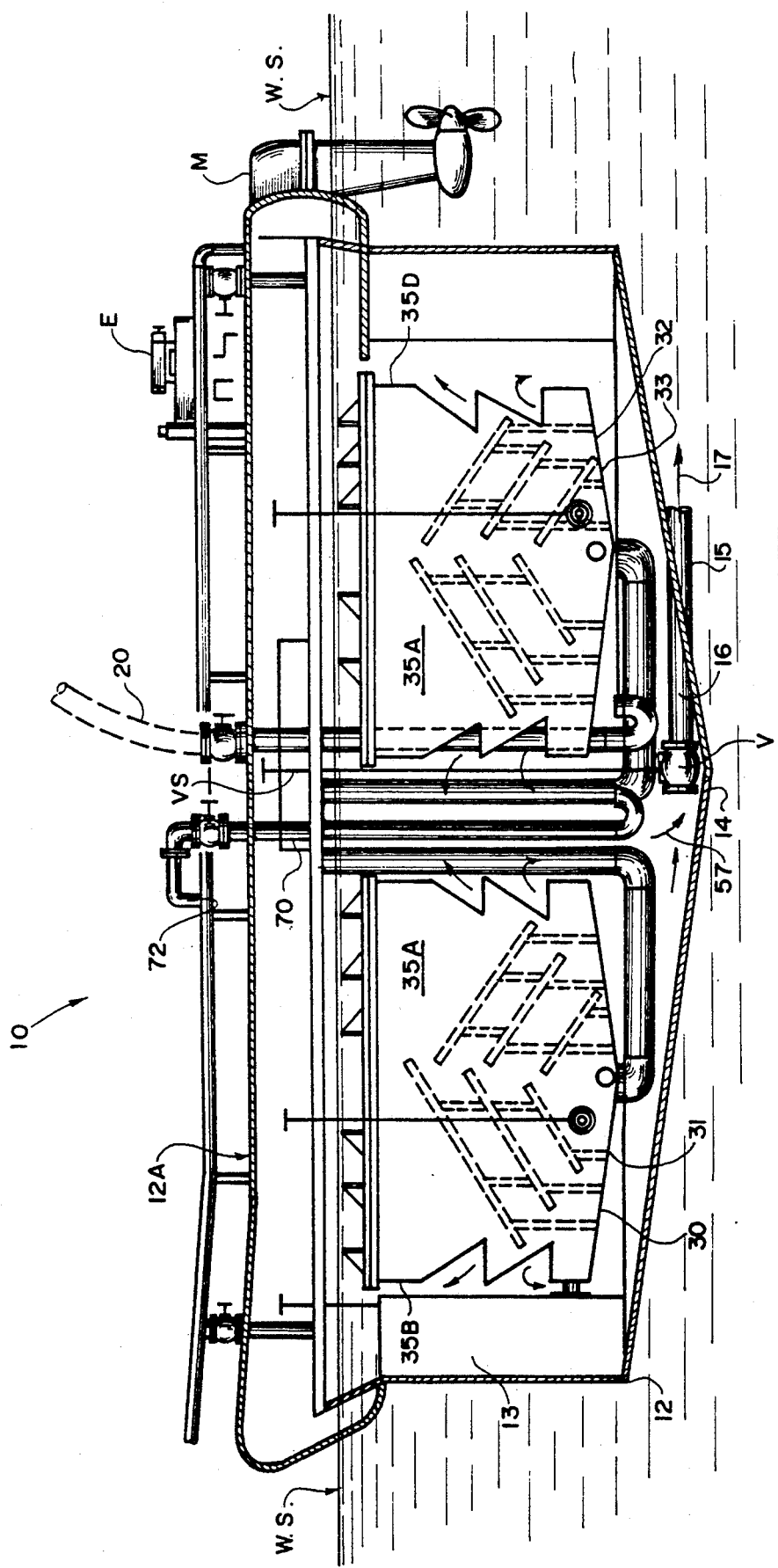
FIG. 1 is an elevational view of the preferred embodiment of the apparatus of the present invention.
Figure 2:
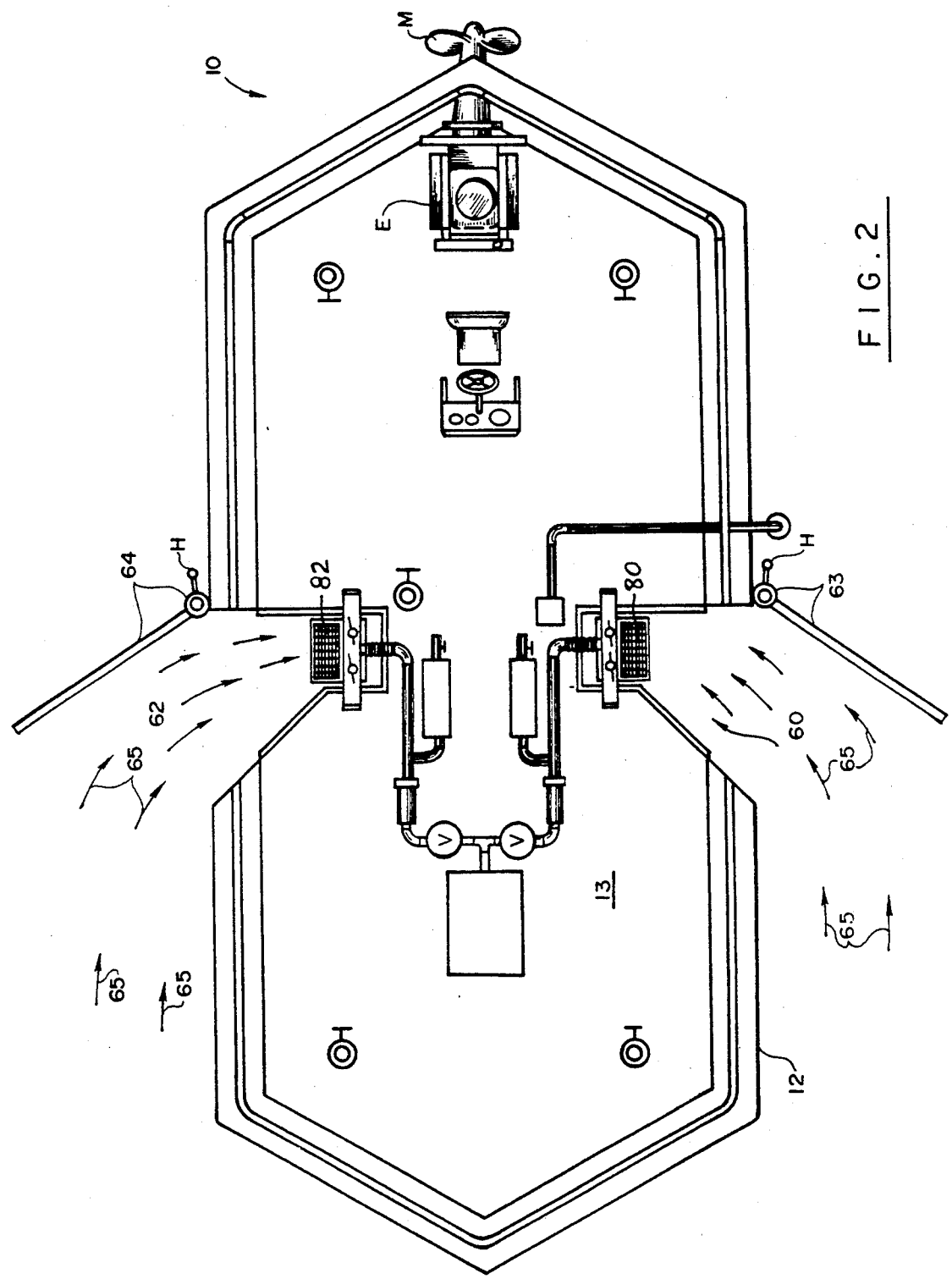
FIG. 2 is a top view of the preferred embodiment of the apparatus of the present invention.
Figure 3:
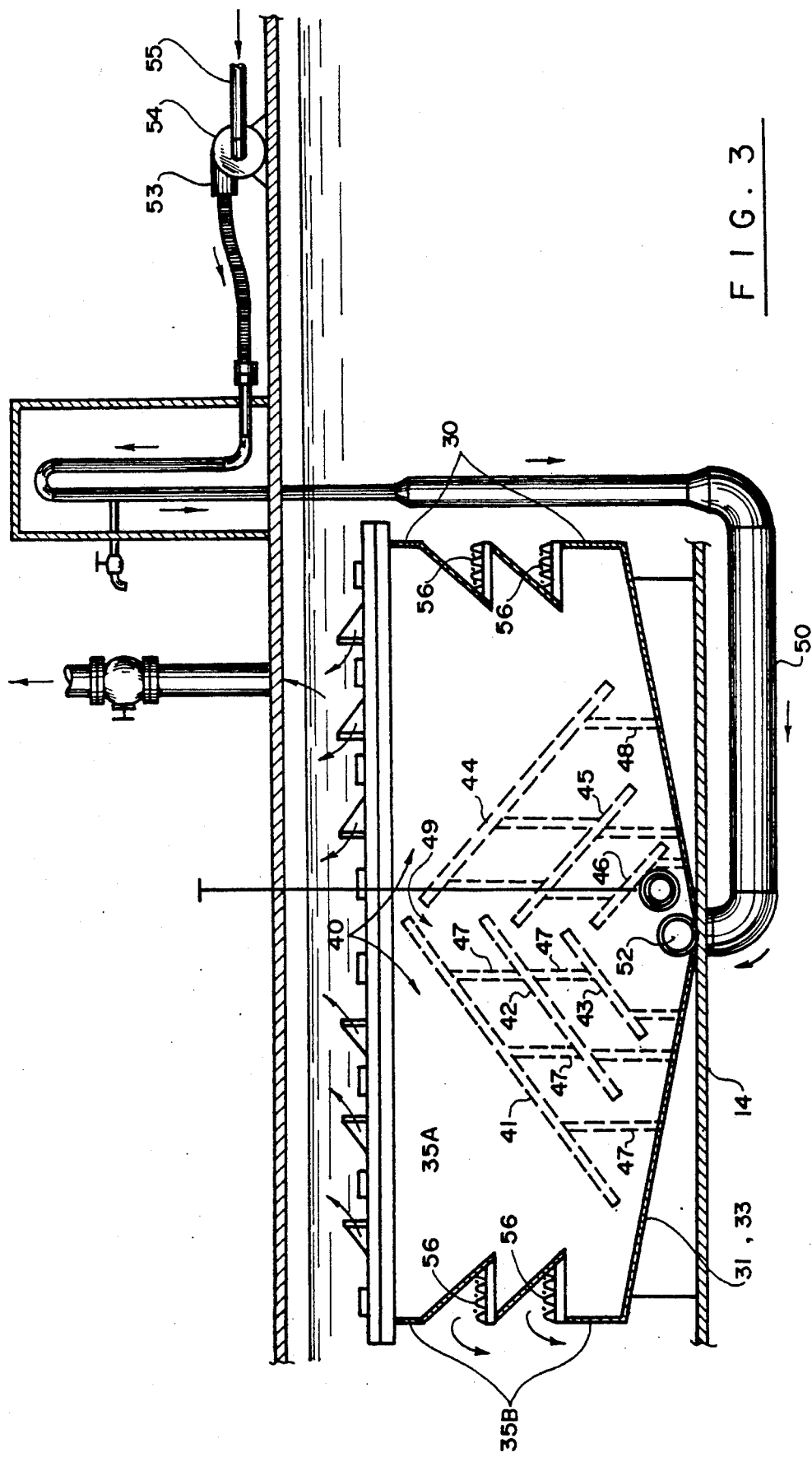
FIG. 3 is a partial sectional elevational view of the preferred embodiment of the apparatus of the present invention illustrating the oil separator and inlet flow line portions thereof.
Figure 4:
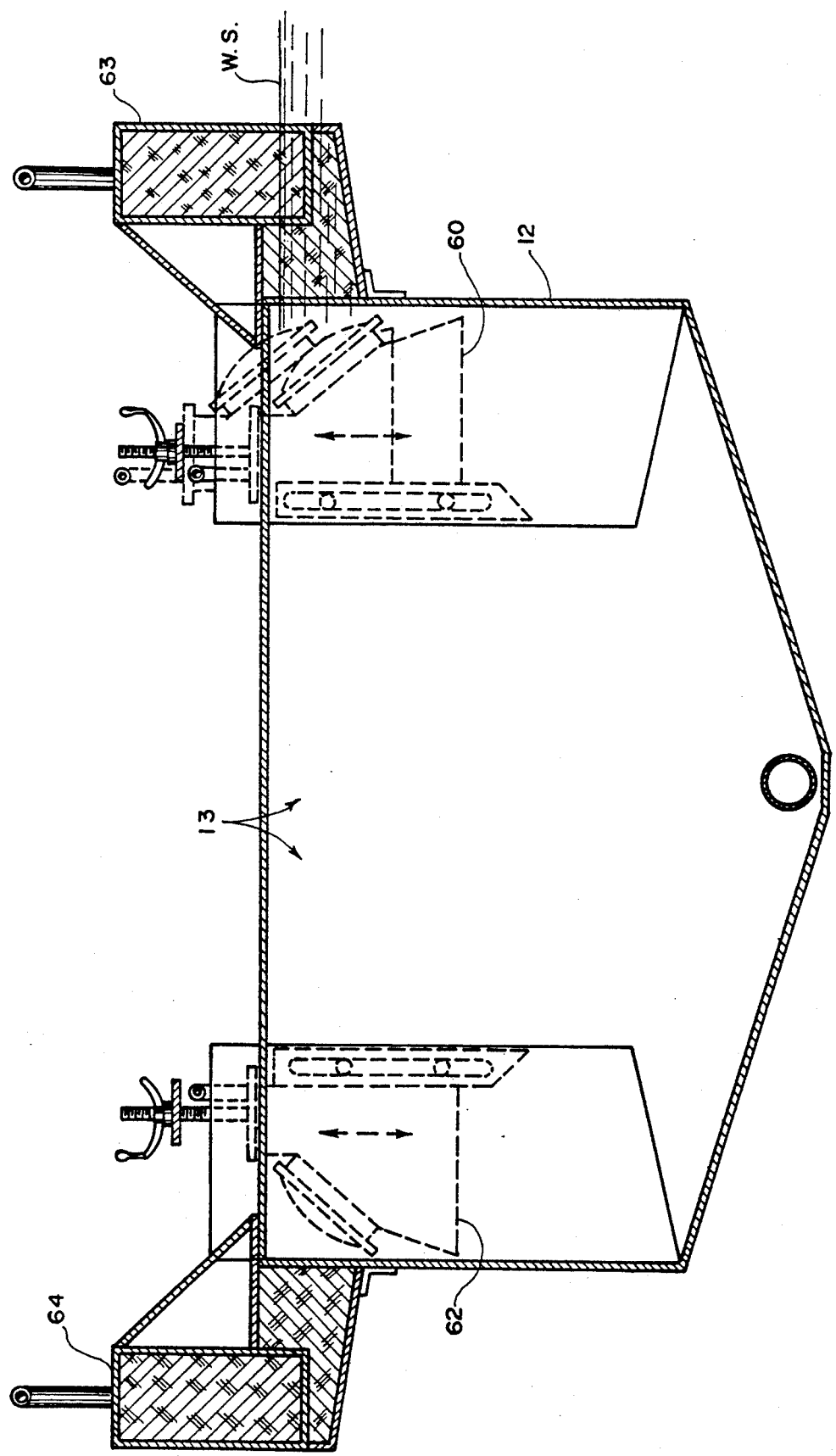
FIG. 4 is a partial elevational view of the preferred embodiment of the apparatus of the present invention illustrating the oil/water intake portions thereof.

FIG. 1 best illustrates the preferred embodiment of the apparatus of the present invention designated generally by the numeral 10. The marine vessel for collecting and separating spilled oil in a marine environment is designated generally by the numeral 10 in FIG. 1. The apparatus includes a floating vessel 12 having an interior 13 for collecting an oil/water mixture from the adjacent water surface WS such as a sea surface, ocean surface, lake surface, or other such waterway.

At least a portion of the collection chamber 13 extends to an elevation below the water surface WS, the bottom being designated generally by the numeral 14. The bottom 14 includes an outlet 15 in the form of an elongated transverse conduit 16 for discharging water from collection chamber 13 as indicated by the arrow 17 in FIG. 1. Thus, as the apparatus 10 intakes an oil/water mixture from the surrounding waterway, oil is continuously separated and the water which is taken in with the oil can be continuously returned to the adjacent waterway, lake, or the like. In addition, an oil discharge line 20 is provided for continuously discharging collected oil from the vessel 10 for collection in a remote location or in an adjacent floating vessel such as a barge or the like. Thus, the present invention provides an apparatus 10 for continuously separating oil and water and for continuously returning water to the adjacent aquatic environment while simultaneously continuously (or in batch form) discharging collected oil to an adjacent "mother" ship, barge, or like vessel.

In the embodiment of FIG. 1, a pair of oil separators 30, 32 are provided. Separators 30, 32 are preferably disposed below the water surface WS. In the preferred embodiment, the water WS externally of the vessel 10 and internally of the vessel 10 are substantially the same. Thus, the vessel 12 can be an open channel so that the water surface WS is the same both internally and externally of the vessel 12. Separators 30, 32 are preferably positioned entirely below the water surface WS, as can be seen in FIG. 1. Each separator 30, 32 can be generally rectangular in plan view defining a rectangular, closed wall structure, each having a bottom 31, 33 respectively, end walls 35A and side walls 35B. It should be understood that a pair of separators 30, 32 are shown in the embodiment of FIG. 1. However, in the scope of the present invention, multiple arrangements of separators could be provided, such as, for example, an array of separators in a larger vessel 10. The bottoms 31, 33 and the vertical end walls 35A and vertical side walls 35B thus define a closed wall separator structure having an interior 40 that separates oil and water during use.

Figure 5:
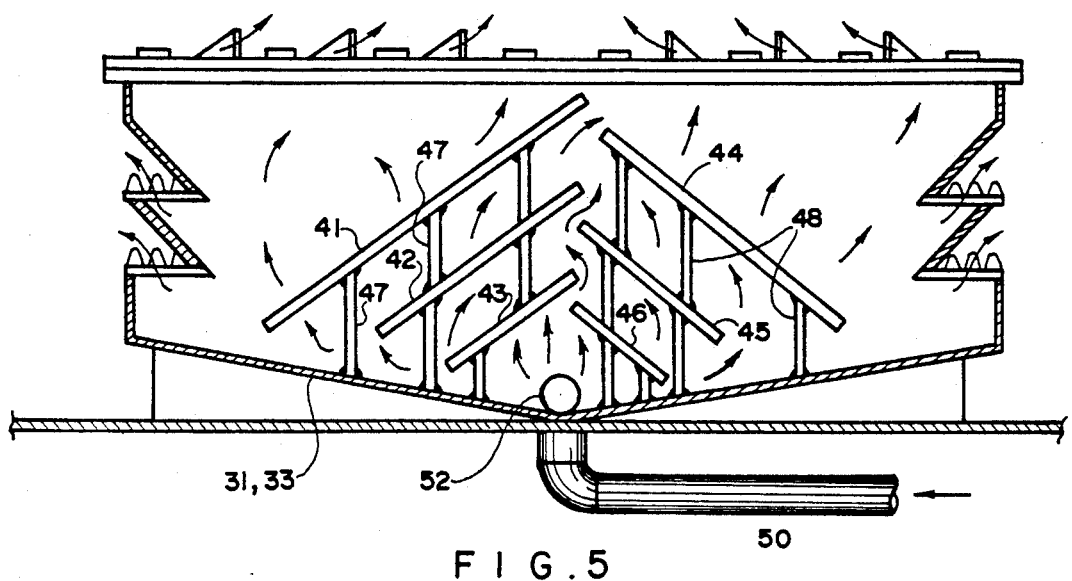
FIG. 5 is fragmentary elevational view of the preferred embodiment of the apparatus of the present invention illustrating the oil separator portion thereof.
Figure 6:
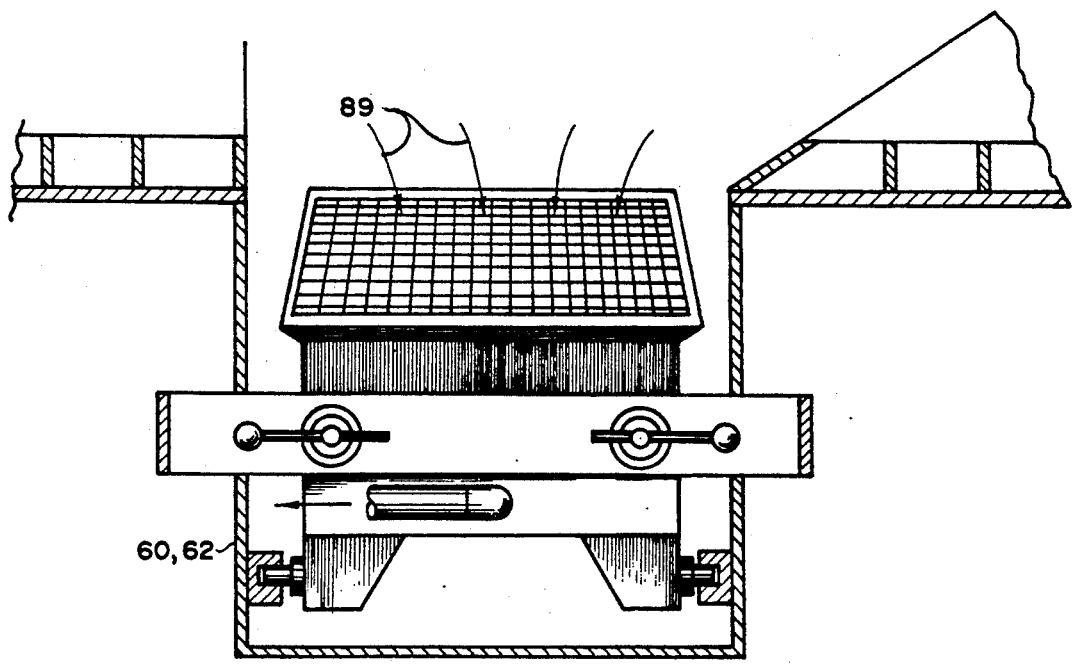
FIG. 6 is a fragmentary elevational view of the preferred embodiment of the apparatus of the present invention illustrating the oil intake portion thereof.

A plurality of longitudinally extending, generally flat rectangular plates 41–46 are positioned in parallel, paired fashion (FIG. 5) and are each preferably inclined. Plates 41–43 are angled at an angle of, for example 30°–45°, and are parallel to each other, being maintained in spaced apart generally parallel and inclined position by means of a plurality of vertical supporting post members 47. Similarly, plates 44–46 are inclined, generally parallel inclined flat plate members which are supported by a plurality of structural posts 48. The posts 47, 48 can be, for example, cylindrical pipe joints or other suitable structural members, such as a flanged "I" beam or the like. Plates 41–46 extend longitudinally, and span between opposed end walls 35A.

Oil inlet 50 dispenses oil via inlet opening 52 to separators 30, 32. Oil inlet flow line 50 thus can be connected to the discharge 53 side of pump 54 which includes a suction line 55 that receives flow from catch basin intakes 60, 62 (see FIG. 2 and 6–8). The pump 54 pumps oil and water mixture which is skimmed from the adjacent sea water area using catch basins 60, 62 to the vessel interior 13 via line 50 and to inlet 52 so that oil and water are added to the separators 30, 32 at the lowermost portion thereof. The water will tend to settle in the separators 30, 32 while the oil will rise upwardly. The rising oil will hit one or more of the plate 41–46 accumulating on the underside surface thereof and being routed toward the central portion of the separator because of the inclined orientation of the plates, including the left plurality of the plates 41–43 and the corresponding right plurality of plates 44–46. Thus, an interior vertical channel 49 is defined between the first set of plates 41–43 and the second set of plates 44–45 which allows oil to flow upwardly. However, the channel 49 is sufficiently narrow so that oil floating upwardly will be substantially coalesced and collected upon the underside of plates 41–46 at the time of discharge at channel 49 upwardly so that substantially water free oil collects at the top of the separators 30, 32. A plurality of side openings 56 allow water to discharge from each separator 30, 32. The discharged water thus flows downwardly to the lowermost portion 14 of vessel 12 where it can exit, as illustrated by the arrow 57 via outlet valve V and discharge line 16. The outlet valve V can have an upwardly extending valve stem VS for operating the valve between open flow and closed flow positions. Stand pipe 70 allows a worker standing upon the vessel deck 12A to monitor the quality of fluid contained at the lowermost portion of the vessel interior 13. Thus, the stand pipe 70 allows an operator to determine whether or not water or in fact oil has filled the vessel interior 13. If the operator pumps fluid upwardly in stand pipe 70 to outlet 72 and finds that oil is transmitted, this means that the vessel has been substantially filled with oil and it is time to pump that oil to a collection vessel, such as a "mother" ship, barge, or the like, via line 20. However, if the operator receives water at outlet 72, operation can continue until such time that the vessel is filled completely with oil. Thus, for example, a small bilge pump or the like could be connected to the stand pipe 70 for a continuous flow of fluid so that an operator would simple glance occasionally at the stand pipe discharge 72 to determine whether or not oil was being discharge therefrom. Thus, the bilge pump (not shown) could pump, for example, a few gallons per minute continuously to determine whether or not the vessel interior 13 were filled with oil.

Each catch basin 60, 62 is equipped with a pivotal boom 63, 64 that could be rotated inwardly and outwardly using handles H. The boom aids in the collection of oil at catch basin 60, 62 as the vessel moves forward under the power of its engine E and motor M, the collection of oil being designated schematically by the flow arrows 65 in FIG. 2. Each basin 60, 62 can have an intake screen 80, 82 respectively and an intake funnel 85, 87 respectively that is positioned to receive incoming spill water designated by the arrows 89 in FIG. 8. The funnels 85, 87 communicate with suction line 55. Funnels 85, 87 can be adjustably, preferably slidably movable with respect to vessel 12 so that their fluid intake position can be changed and adjusted vertically using telescoping suction pipe section 55A.

FIGS. 9-12 illustrate an alternate embodiment of the apparatus of the present invention, designated generally by the numeral 100.

Oil/water skimmer 100 provides a floating barge hull 101 that floats on the water surface WS but extends a distance below. The barge hull 101 provides a forward intake structure 102 having an inlet 103. Water and oil typically mix at the surface of an oil slick or spill and therefore the intake structure 102 must extend a certain distance below the water surface such as, for example, 2-4 feet. In this manner, the oil is ingested with a large amount of surrounding seawater. Arrow 104 in FIG. 11 illustrates generally the intake of oil and seawater by intake structure 102.

Auger 105 is positioned at the rear of intake structure 102 and is an optional feature for enhancing the intake of floating oil along with the seawater. An influent line 106 carries the oil/water mixture rearwardly and downwardly, the influent line 106 communicating with elbow 107 transmits flow from influent line 106 into separator body 108.

Separator body 108 includes side walls 109 and has an interior 110. An upper surface is perforated with openings 115. Bottom 112 includes outlet 126. Side walls 109 have multiple side outlet ports 113, including an upper and a lower row of outlet ports 113. Bottom 112 includes outlet opening 114 for discharging water from separator body 108.

The plurality of top openings 115 in upper surface plate 111 are surrounded by angle plate 116 so that the openings 115 are louvered. Oil droplets rise within the interior 110 of separator body 108 and accumulate upon the angle plates 116 before floating upwardly to engage transverse perforated horizontal baffle 135 (see FIG. 11).

Elbow 107 communicates with horizontal tube 117 that includes a number of openings designed to discharge oil and water including top openings 118, side openings 119, and bottom openings 120. Each of the openings provides angled plates in the form of louver plates 121-123. The top openings have angled louver plates 121. Side openings 119 have angled louver plates 122, and bottom openings 120 provide bottom louver plates 123. Horizontal tube 117 includes an end plate 124.

Figure 9:
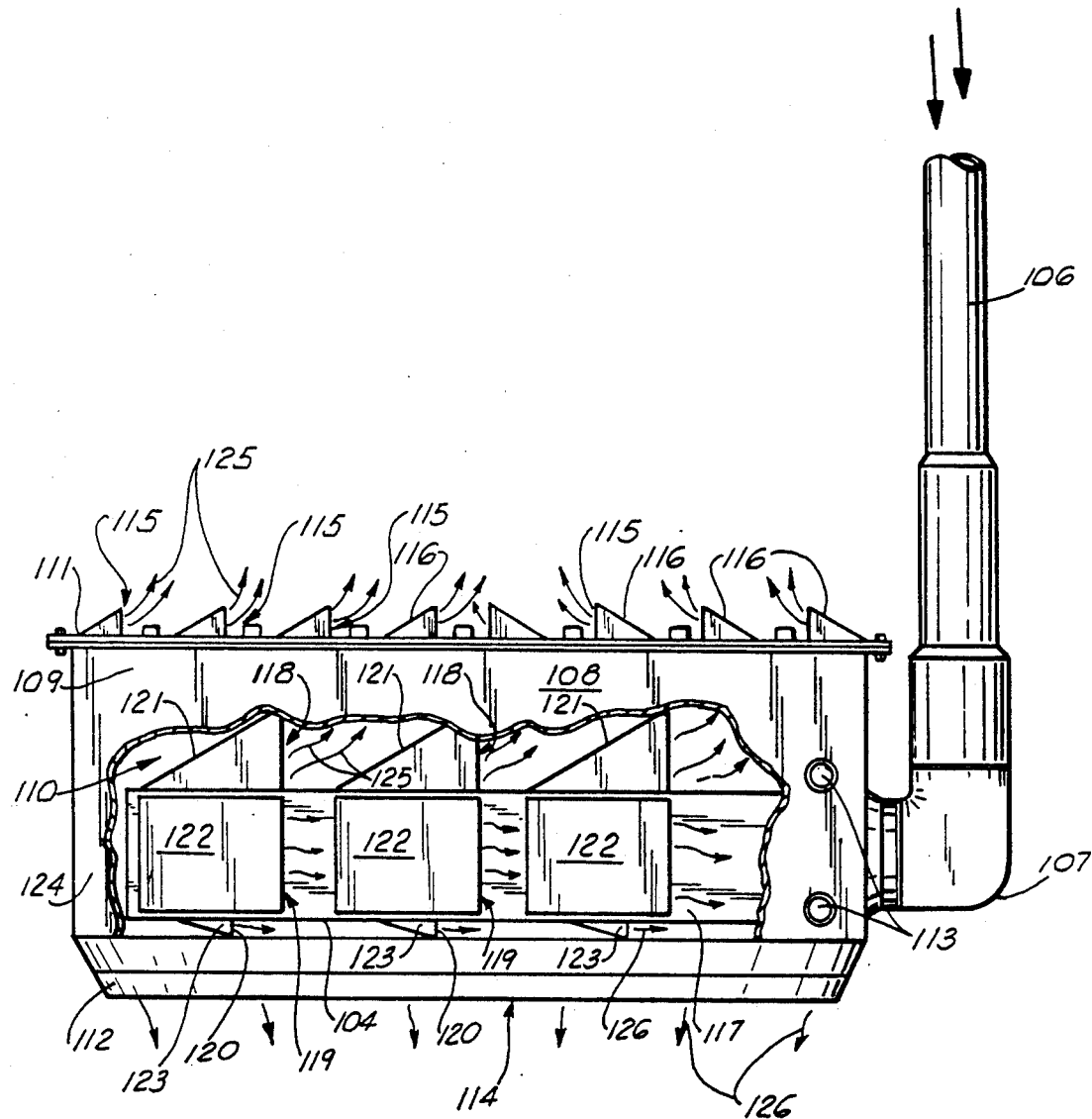
FIG. 9 is an elevational view of an alternate embodiment of the apparatus of the present invention.

In FIG. 9, the flow of oil is designated generally in an upwardly direction through the various openings using arrows 125.

The heavier water flow is designated by the downwardly directed arrows 126.

Figure 10:
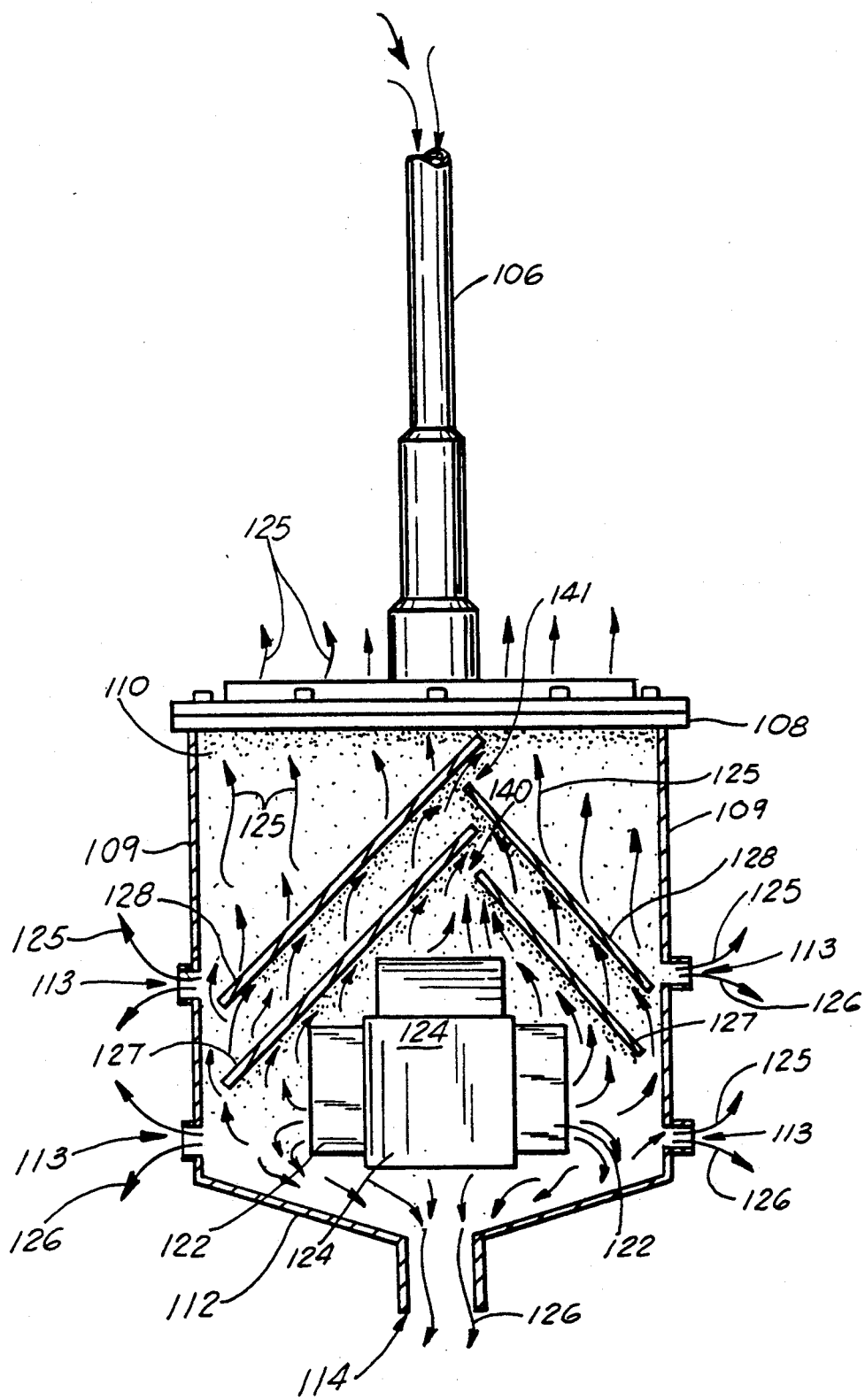
FIG. 10 is a sectional view of an alternate embodiment of the apparatus of the present invention.

In FIG. 10, the separator body 108 is shown in horizontal section viewing the interior 110 from the end portion adjacent end plate 124. Inside the separator body 108 interior 110, there can be seen a plurality of angled plates including a first pair of lowermost angled plates 127 and a second pair of uppermost angled plates 128. The highest portion of each angle plate is placed at the center of interior 110 and the uppermost ends of each plate 127, 128 overlap, as shown in FIG. 10, so that oil accumulates on the underside of each of the plates 127, 128 and moves upwardly within interior 110, exiting between the gaps 140, 141.

In FIG. 12, a partial transverse view of the barge hull 101 is shown, illustrating the floatation tanks 131 which are positioned above oil storage tank 134 and water storage tank 133. Conduits or hoses can be used to withdraw oil on a continuous or batch basis from the oil storage tank 134, and transmitted to a storage vessel. The transverse horizontal baffle 135 is perforated so that oil rising upwardly in separator 108 and exiting the plurality of openings 115 can accumulate under the transverse baffle 135 and enter the storage tank 134. Vents 32 allow the oil level in tank 134 to rise and fall, and provide access to check oil level in tank 134 using a level rod, ruler or dip stick. In this fashion, the heavier water occupies the large bulk of the vessel 100, being disposed in tank 133. Because the separator 108 is positioned below water surface WS, and because the surrounding seawater is heavier than the oil contained within the separator 108 interior 110, the oil continuously attempts to rise upwardly toward the transverse horizontal baffle plate 135. Thus, it should be understood that the transverse baffle plate 135 and the oil tank 134 will always be in a position below the water surface WS.

The vessel 100 illustrated in FIG. 11 can be self-propelled. Vessel 100 thus has a propeller 136 and rudder 137.

In view of the numerous modifications which could be made to the preferred embodiments disclosed herein without departing from the scope or spirit of the present invention, the details herein are to be interpreted as illustrative and not in a limiting sense.

What is claimed as invention is:

1. A marine vessel for collecting and separating spilled oil in a marine environment having a sea level surface comprising:

a) a floating vessel having an interior collection chamber for receiving an oil/water mixture from the adjacent sea surface;

b) at least a portion of the collection chamber extending to an elevation below the sea surface during use;

c) at least one or more oil/water separator contained within the vessel collection chamber, and positioned at least partially below the sea level surface during use so that oil and water can be separated in the separator and below the sea level surface by the mechanical action of the oil attempting to rise to the sea level surface;

d) the separator comprising a plurality of vertically spaced members with surfaces that allow rising oil to accumulate thereon during separation;

e) an oil inlet at the lower end portion of the separator for adding oil to the separator;

f) at least one intake for collecting an oil and water mixture from the adjacent sea surface; and g) a flow line for communicating oil from the intakes to the separator at the oil inlet portion thereof, the flow line having at least a portion with oil/water outlets thereon, the outlets having plate-like structures for accumulating oil droplets thereon so that oil droplets can combine at the plate like structures.

2. The apparatus of claim 1, wherein the intake comprises a catch basin having an outlet with an elevation that extends below the sea level surface during use.

3. The apparatus of claim 2, wherein the vessel is self-propelled.

4. The apparatus of claim 1, wherein the separator comprises a closed wall separator having multiple vertically spaced plates.

5. The apparatus of claim 4, wherein at least some of the plates are angled with respect to horizontal.

6. The apparatus of claim 4, wherein at least some of the plates are parallel to each other.

7. The apparatus of claim 1, wherein the separator comprises a closed wall structure having a bottom, and a side wall defining an oil holding interior, and the side walls include at least one water outlet, the oil inlet communicating with the bottom, and the interior having multiple transverse, vertically spaced plate members with surfaces for catching and accumulating oil rising within the interior that has been introduced thereinto via oil inlet.

8. The apparatus of claim 7, wherein the plates are generally flat.

9. The apparatus of claim 7, wherein the plates are generally flat and include vertically spaced plates, each angled with respect to horizontal.

10. The apparatus of claim 7, wherein the vessel collection chamber has an operating fluid upper surface and the oil/water separator is disposed below the operating fluid surface during use.

11. The apparatus of claim 1, further comprising means for determining the level of oil.

* * * * *